United States Patent
Kuentzmann et al.

(10) Patent No.: US 11,581,837 B2
(45) Date of Patent: Feb. 14, 2023

(54) CONTROL METHOD AND ASSOCIATED CONTROL SYSTEM

(71) Applicant: IFP Energies nouvelles, Rueil-Malmaison (FR)

(72) Inventors: Emmanuel Kuentzmann, Rueil-Malmaison (FR); Fabien Vidal-Naquet, Rueil-Malmaison (FR); Wissam Dib, Rueil-Malmaison (FR)

(73) Assignee: IFP ENERGIES NOUVELLES, Rueil Malmaison (FR)

( * ) Notice: Subject to any disclaimer, the term of this patent is extended or adjusted under 35 U.S.C. 154(b) by 0 days.

(21) Appl. No.: 17/298,804

(22) PCT Filed: Nov. 22, 2019

(86) PCT No.: PCT/EP2019/082319
§ 371 (c)(1),
(2) Date: Jun. 1, 2021

(87) PCT Pub. No.: WO2020/109185
PCT Pub. Date: Jun. 4, 2020

(65) Prior Publication Data
US 2022/0060131 A1    Feb. 24, 2022

(30) Foreign Application Priority Data
Nov. 30, 2018  (FR) ...................... 1872188

(51) Int. Cl.
*H02P 27/08*  (2006.01)
*H02P 21/22*  (2016.01)
*H02P 27/12*  (2006.01)

(52) U.S. Cl.
CPC .............. *H02P 21/22* (2016.02); *H02P 27/12* (2013.01); *H02P 2207/05* (2013.01)

(58) Field of Classification Search
CPC ........ H02P 27/085; H02P 21/22; H02P 27/12; H02P 2207/05
See application file for complete search history.

(56) References Cited

U.S. PATENT DOCUMENTS

2013/0063058 A1* 3/2013 Shouji ................... H02P 27/085
                                                                318/400.06
2015/0222214 A1  8/2015 Maloum et al.
(Continued)

FOREIGN PATENT DOCUMENTS

EP    1868288 A1   12/2007
FR    2994355 A1   2/2014
(Continued)

OTHER PUBLICATIONS

International Search Report for PCT/EP2019/082319, dated Jan. 22, 2020.

*Primary Examiner* — Cortez M Cook
(74) *Attorney, Agent, or Firm* — Fitch, Even, Tabin & Flannery LLP

(57) ABSTRACT

The object of the invention is a method of controlling a permanent-magnet synchronous or synchro-reluctant three-phase rotary machine (4), comprising the following steps:
measuring a current ($i_A$, $i_B$, $i_C$) flowing through each phase of a stator of rotary machine (4);
first calculating, by use of a single proportional-integral controller, a switching control signal for controlling an inverter (10), according to each measured current ($i_A$, $i_B$, $i_C$), and of a target value ($T_{ref}$) of a mechanical torque provided by the rotary machine (4) or of a target value of an angular speed of a rotor of rotary machine (4) in relation to the stator wherein the inverter (10) is configured to convey electrical (Continued)

energy between a continuous electrical energy source (8) and each phase of the stator of rotary machine (4); and controlling the inverter (10) by use of the calculated switching control signal.

12 Claims, 1 Drawing Sheet

(56) References Cited

U.S. PATENT DOCUMENTS

2016/0359442 A1  12/2016  Zhao et al.
2019/0149015 A1  5/2019  Boisson et al.

FOREIGN PATENT DOCUMENTS

| FR | 3012270 A1 | 4/2015 |
| FR | 3051296 A1 | 11/2017 |
| WO | 03084049 A1 | 10/2003 |

\* cited by examiner

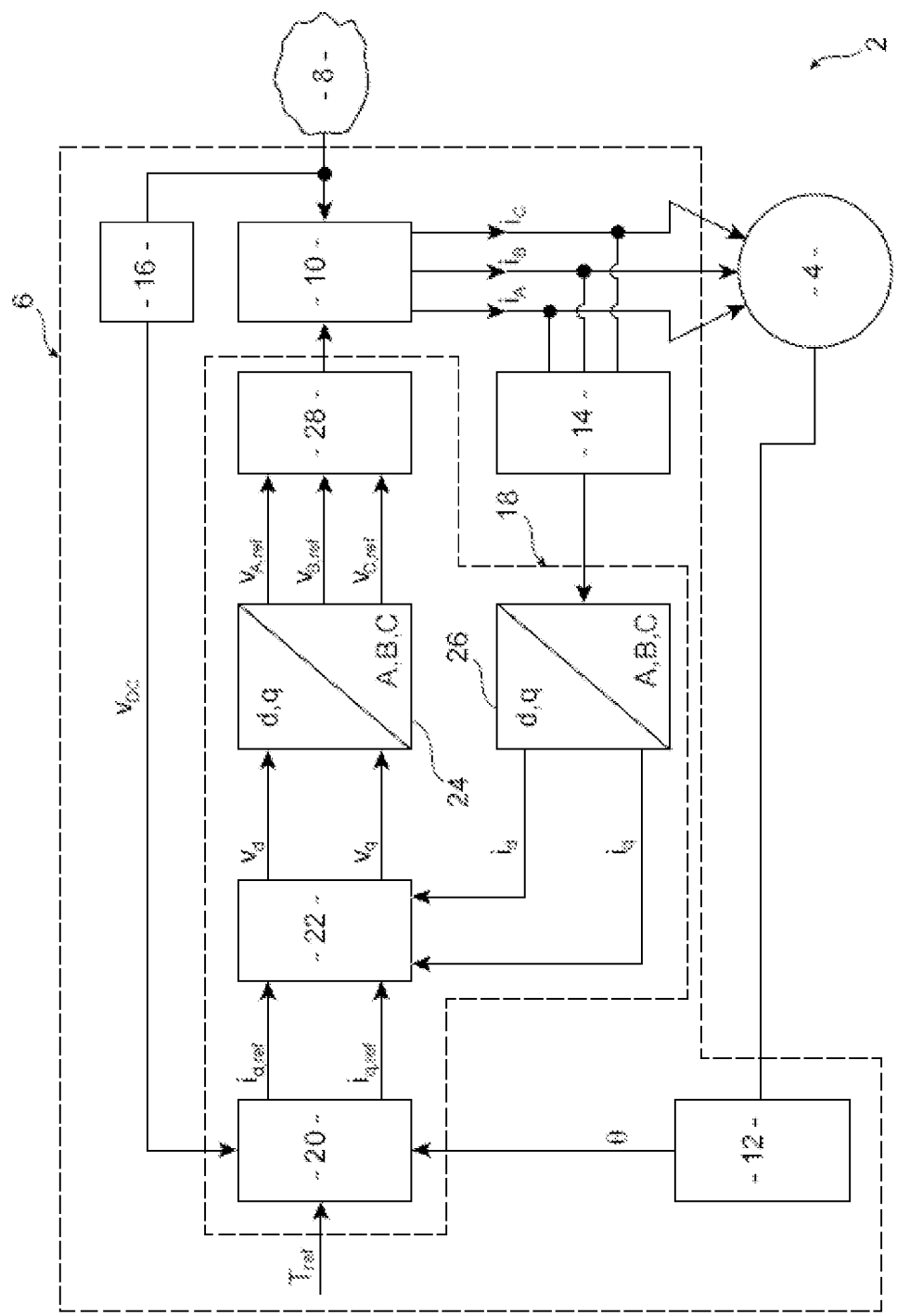

CONTROL METHOD AND ASSOCIATED CONTROL SYSTEM

CROSS-REFERENCE TO RELATED APPLICATIONS

This application is a U.S. national phase application filed under 35 U.S.C. § 371 of International Application No. PCT/EP2019/082319, filed Nov. 22, 2019, designating the United States, which claims priority from French Patent Application No. 18/72.188, filed Nov. 30, 2018, which are hereby incorporated herein by reference in their entirety.

BACKGROUND OF THE INVENTION

Field of the Invention

The present invention relates to a method of controlling a permanent-magnet synchronous or synchro-reluctant three-phase rotary machine and to a control system.

The invention concerns the field of rotary machine control, in particular for the control of permanent-magnet synchronous machines and synchro-reluctant machines.

Description of the Prior Art

It is well known to use rotary machines such as permanent-magnet synchronous machines or synchro-reluctant machines and in particular permanent magnet-assisted synchro-reluctant machines. Such rotary machines are used, for example, in the field of propulsion, for example for generation of engine torques onboard a vehicle such as a motor vehicle.

FR-3,051,296 A1 describes for example a permanent magnet-assisted synchro-reluctant machine.

Such rotary machines are advantageous because, when a so-called "voltage saturation" regime is reached, it is still possible to increase the rotational speed of the rotor of the machine while limiting significantly the decrease of the mechanical torque provided by the rotary machine, by carrying out an operation referred to as "defluxing". Such a decrease of the mechanical torque provided by the rotary machine, when the rotational speed is increased, is a common unwanted phenomenon that occurs when defluxing is not performed.

With the present invention, a "voltage saturation regime" is understood to be a situation where the voltage applied to the terminals of the rotary machine becomes equal to the maximum available voltage whose value depends on the electrical installation to which the rotary machine is connected, so that it is no longer possible to increase the supply voltage of the rotary machine.

With the present invention, "defluxing" is a method of controlling such a rotary machine, comprising current injection at the phases, that is the windings, of the stator of the rotary machine in order to compensate at least partly for the magnetic field generated by the magnets of the rotor of the rotary machine.

Such a control method generally comprises calculation of the "direct" and "quadrature" currents and voltages, which are virtual currents and voltages expressed in a rotating reference frame of the rotor, and the use of two servo systems with one being relative to the so-called direct quantities and the other being the so-called quadrature quantities, in order to determine the voltages to be applied to each phase of the rotary machine.

With rotary machines mentioned above being synchronous, defluxing involves synchronization between the rotating magnetic fields of the stator and the rotor. The angle formed between the respective directions of the magnetic field of the rotor magnets and the currents expressed in the rotating reference frame attached to the rotor is referred to as "defluxing angle".

Defluxing thus generates a magnetic field induced by the stator currents to compensate at least partly for the effect of the magnetic field of the rotor, in order to reduce the terminal voltage of the rotary machine. The rotary machine thus is capable of absorbing more current and therefore of providing a higher mechanical torque, at the same speed, than without defluxing. Defluxing is therefore advantageous insofar as it limits the mechanical torque loss produced by the rotary machine and it increases the rotational speed of the rotor at a given torque value, without the terminal voltage of the rotary machine exceeding the maximum voltage. Thus, even in a voltage saturation regime, the power consumed by the rotary machine is maintained equal to a higher power than in the absence of defluxing, which results in better performances.

Notably, synchro-reluctant machines have high defluxing capacities, which allows benefit from a large part of their power up to the maximum speed thereof.

However, such a control method is not entirely satisfactory.

Indeed, in a conventional control method as described above, the efficiency of the electric machine is not satisfactory.

This notably originates from the fact that, in such a usual control method, the maximum available voltage is not applied to the terminals of the rotary machine. This is due to the fact that, if the voltage applied to the electric machine were to be maximal, only the phase of the voltage would be a degree of freedom for control of the rotary machine, which would create stability problems.

It follows that, in a conventional control method as described above, it is generally decided to apply to the rotary machine a voltage below the maximum available voltage, to benefit from two degrees of freedom for control which are the phase of the voltage and the norm of the voltage applied to the terminals of the rotary machine.

Such a choice is at the expense of the efficiency of the rotary machine.

SUMMARY OF THE INVENTION

The invention provides a control method resulting in a reduced performance degradation of the rotary machine, notably during defluxing, while reducing the instability of the mechanical torque delivered during the defluxing, and while enabling maximum use of the available voltage.

Thus the invention is a method of the aforementioned type comprising the following steps:
  measuring a current flowing through each phase of a stator of the rotary machine;
  first calculating, by use of a single proportional-integral controller, a switching control signal for controlling an inverter, according to each measured current, and of a target value of a mechanical torque provided by the rotary machine or of a target value of an angular speed of a rotor of the rotary machine in relation to the stator, the inverter being configured to convey electrical energy between a continuous electrical energy source and each phase of the stator of the rotary machine;

controlling the inverter by use of the calculated switching control signal.

Indeed, such a method, by using a single proportional-integral controller, reduces the coupling between the direct and quadrature quantities, which results in less non-linearities in the control, and therefore enables control of the rotary machine wherein the maximum available voltage is applied to the terminals of the rotary machine, without instability problems. Such a method is therefore capable of increasing the efficiency of the rotary machine during defluxing.

According to other advantageous aspects of the invention, the method comprises one or more of the following characteristics, taken in isolation or according to all the technically possible combinations:

the first calculation comprises determining a quadrature voltage setpoint according to:

$$v_{q,ref} = K'_{p,q}(i_0 - i_{ref}) + K'_{i,q} \int_{t_0}^{t_f}(i_0 - i_{ref})dt$$

where $v_{q,ref}$ is the quadrature voltage setpoint;
$K'_{p,q}$ and $K'_{i,q}$ are predetermined coefficients of the single proportional-integral controller;
$i_0$ is a quantity defined as $i_0 = \sqrt{i_q^2 + i_d^2}$;
$i_{ref}$ is a quantity defined as $i_{ref} = \sqrt{i_{q,ref}^2 + i_{d,ref}^2}$;
$t_0$ is a predetermined initial instant;
$t_f$ is a predetermined final instant later than the predetermined initial instant;
$i_q$ and $i_d$ are respectively a measured direct current and a measured quadrature current, depending on each measured current;
$i_{d,ref}$ and $i_{q,ref}$ are respectively a direct current setpoint and a quadrature current setpoint, each representative of the target value of the mechanical torque provided by the rotary machine or of the target value of the angular speed of the rotor of the rotary machine in relation to the stator; the switching control signal depending on the quadrature voltage setpoint;

the first calculation further comprises determining a direct voltage setpoint according to:

$$v_{d,ref} = \sqrt{v_{lim}^2 - v_{q,ref}^2}$$

where $v_{d,ref}$ is the direct voltage setpoint;
$v_{lim}$ is a limit voltage defined as $v_{lim} = av_{DC}$;
a is a predetermined inverter modulation index;
the switching control signal further depending on the direct voltage setpoint;

the value of the modulation index ranges between $1/\sqrt{3}$ and 1;

the predetermined coefficients of the single proportional-integral controller are selected so that the value of the quadrature voltage setpoint thus determined is bounded, preferably less than or equal to a limit voltage defined as $v_{lim} = av_{DC}$;

where $v_{lim}$ is the limit voltage;
a is a predetermined inverter modulation index;
$v_{DC}$ is a voltage between the source and a potential reference;

the first calculation is implemented if a predetermined condition is verified;

the method comprises determining a direct voltage setpoint and a quadrature voltage setpoint depending on each measured current, the predetermined condition being verified if the sum of the squares of the direct voltage setpoint and of the quadrature voltage setpoint is greater than or equal to a predetermined fraction of the square of a predetermined limit voltage, advantageously greater than or equal to 75% of the square of the predetermined limit voltage, for example greater than or equal to 90% of the square of the predetermined limit voltage, or equal to the square of the predetermined limit voltage; and the direct voltage setpoint and the quadrature voltage setpoint are determined during a second calculation of the switching control signal, distinct from the first calculation, the predetermined condition being verified if, while carrying out the second calculation, the sum of the squares of the direct voltage setpoint and of the quadrature voltage setpoint becomes greater than or equal to the predetermined fraction of the square of a predetermined limit voltage, or equal to the square of the predetermined limit voltage;

the predetermined condition is verified if the angular speed of the rotor of the rotary machine in relation to the stator is greater than or equal to a predetermined base speed.

Furthermore the invention is a system for controlling a permanent-magnet synchronous or synchro-reluctant three-phase rotary machine, comprising:

a current sensor configured to measure a current flowing through each phase of a stator of the rotary machine;

an inverter configured to convey electrical energy between a continuous electrical energy source and each phase of the stator of the rotary machine; and a calculator configured to carry out, using a single proportional-integral controller, a first calculation of a switching control signal for control of the inverter, according to each current measured by the current sensor, and of a quantity representative of a target value of a mechanical torque provided by the rotary machine or a target value of an angular speed of a rotor of the rotary machine in relation to the stator, the calculator being further configured to apply to the inverter the calculated switching control signal in order to control the inverter.

According to another advantageous aspect of the invention, the control system has the feature of the calculator being configured to implement the control method as defined above, except for the measurement step.

BRIEF DESCRIPTION OF THE DRAWING

Other features and advantages of the invention will be clear from reading the description hereafter, given by way of non-limitative example, with reference to the accompanying sole FIGURE wherein:

FIG. 1 schematically shows a control system according to the invention associated with a permanent-magnet synchronous or synchro-reluctant three-phase rotary machine.

DETAILED DESCRIPTION OF THE INVENTION

FIG. 1 shows an installation 2 comprising a rotary machine 4 associated, for control thereof, with a control system 6 according to the invention. Installation 2 also comprises an electrical energy source 8 such as a direct voltage bus.

Rotary machine 4 is a permanent-magnet synchronous or synchro-reluctant three-phase rotary machine, in particular a permanent magnet-assisted synchro-reluctant three-phase rotary machine.

Rotary machine 4 has three inputs, respectively identified by letters A, B, C. Each input A, B, C corresponds to a phase of a stator of rotary machine 4.

A quantity relating to a given input of rotary machine 4 will therefore have a subscripted letter relating to the input.

Control system 6 controls over time the power supplied to rotary machine 4 according to at least one of target values and measured values of predetermined quantities that are described hereafter.

Control system 6 comprises an inverter 10, an angular position sensor 12, a current sensor 14, a voltage sensor 16 and a calculator 18.

Inverter 10 is configured to convey electrical energy between source 8 and rotary machine 4. More precisely, inverter 10 is configured to convey electrical energy between source 8 and each phase of the stator of rotary machine 4.

Inverter 10 comprises a first input connected to source 8 and three outputs which each are connected to a corresponding phase of the stator of rotary machine 4. Inverter 10 additionally comprises a second input electrically connected to an output of calculator 18, so that inverter 10 is configured to convey electrical energy between source 8 and rotary machine 4 according to a switching control signal applied by calculator 18 to the second input of inverter 10.

Preferably, the switching control signal is such that inverter 10 conveys electrical energy from source 8 to rotary machine 4 so that rotary machine 4 operates as a motor.

Angular position sensor 12 is configured to measure the angular position, denoted by θ, of a rotor (not shown) of rotary machine 4 with respect to the stator, and to deliver an angular position signal representative of the measured value of angular position θ of the rotor of rotary machine 4.

Moreover, angular position sensor 12 is configured to apply the angular position signal to a corresponding input of calculator 18.

Current sensor 14 is configured to measure the intensity, denoted by $i_A$, $i_B$, $i_C$, of the current delivered through each output of inverter 10 which each supplying a corresponding phase of the stator of rotary machine 4. Current sensor 14 is also configured to deliver an intensity signal representative of the measured value of each intensity $i_A$, $i_B$, $i_C$.

Moreover, current sensor 14 is configured to apply the intensity signal to a corresponding input of calculator 18.

Voltage sensor 16 is configured to measure the voltage, denoted by $v_{DC}$, between source 8 and a potential reference, and to deliver a voltage signal representative of the measured value of voltage $v_{DC}$. In other words, voltage sensor 16 is configured to measure voltage $v_{DC}$ between the first input of inverter 10 and the potential reference.

Moreover, voltage sensor 16 is configured to apply the voltage signal to a corresponding input of calculator 18.

Calculator 18 is configured to control the operation of inverter 10 according to the value of a desired target torque $T_{ref}$ at the outlet of rotary machine 4. More precisely, calculator 18 is configured to control the operation of inverter 10 according to target torque $T_{ref}$ and of at least one of the angular position signal, the intensity signal and the voltage signal.

Calculator 18 comprises a current setpoint calculation device 20, a current control device 22, a first transformation device 24, a second transformation device 26 and a pulse width modulation device 28.

Second transformation device 26 is configured to calculate a measured direct current $i_d$ and a measured quadrature current $i_q$. In particular, second transformation device 26 is configured to calculate measured direct current $i_d$ and measured quadrature current $i_q$ from the intensity signal delivered by current sensor 14.

More precisely, second transformation device 26 is configured to calculate measured direct current $i_d$ and measured quadrature current $i_q$ by applying a Park transformation to intensities $i_A$, $i_B$, $i_C$ measured by current sensor 14. Such a transformation is achieved by applying relation (1) as follows:

$$\begin{pmatrix} i_d \\ i_q \end{pmatrix} = \begin{pmatrix} \cos\theta_e & \cos\left(\theta_e - \frac{2\pi}{3}\right) & \cos\left(\theta_e + \frac{2\pi}{3}\right) \\ -\sin\theta_e & -\sin\left(\theta_e - \frac{2\pi}{3}\right) & -\sin\left(\theta_e + \frac{2\pi}{3}\right) \end{pmatrix} \begin{pmatrix} i_A \\ i_B \\ i_C \end{pmatrix} \quad (1)$$

where $\theta_e$ is an electric angular position of the rotor with respect to the stator of rotary machine 4, equal to pθ with p being the number of pole pairs of rotary machine 4.

Such a transformation is intended to simplify control by changing from quantities represented with respect to the three stationary windings of the stator to virtual quantities associated with only two fictitious windings attached to the rotor, in quadrature with respect to one another, and moving at the same angular speed as the rotor. For example, the currents bearing subscripts "d" and "q" correspond to the currents respectively flowing through each of the two fictitious windings with the voltages bearing subscripts "d" and "q" corresponding to voltages at the terminals of each of the two fictitious windings respectively.

Current setpoint calculation device 20 is configured to calculate a direct current setpoint $i_{d,ref}$ and a quadrature current setpoint $i_{q,ref}$.

Direct current setpoint $i_{d,ref}$ and quadrature current setpoint $i_{q,ref}$ are quantities representative of target values for intensities $i_A$, $i_B$, $i_C$, that is setpoints for intensities $i_A$, $i_B$, $i_C$. Notably, direct current setpoint $i_{d,ref}$ and quadrature current setpoint $i_{q,ref}$ which are only related to the target values of intensities $i_A$, $i_B$, $i_C$.

Current setpoint calculation device 20 is configured to calculate direct current setpoint $i_{d,ref}$ and quadrature current setpoint $i_{q,ref}$ according to target torque $T_{ref}$, to the angular position signal received from angular position sensor 12 and to the voltage signal received from voltage sensor 16.

More precisely, current setpoint calculation device 20 is configured to calculate direct current setpoint $i_{d,ref}$ and quadrature current setpoint $i_{q,ref}$ in such a way that direct current setpoint $i_{d,ref}$ and quadrature current setpoint $i_{q,ref}$ verify relation (2) as follows:

$$T_{ref} = p\sqrt{\frac{3}{2}} \Phi i_{q,ref} + p(L_d - L_q)i_{d,ref}i_{q,ref} \quad (2)$$

where p is the number of pole pairs of rotary machine 4, $L_d$ and $L_q$ are the inductances of rotary machine 4, respectively along the so-called "direct" and "quadrature" axes of the rotary machine, and φ is the permanent magnet flux in the rotating reference frame attached to the rotor, more precisely along a so-called "direct axis" of the rotating reference frame.

Furthermore, direct current setpoint $i_{d,ref}$ and quadrature current setpoint $i_{q,ref}$ are for example obtained by mapping from predetermined charts, or by use of an equation allowing minimization of the Joule losses given by $R(i^2_{d,ref} + i^2_{q,ref})$, R being the resistance of a phase of rotary machine 4.

The notions of inductance along the direct axis $L_d$ and inductance along the quadrature axis $L_q$, as well as determination of the value of such inductances $L_d$, $L_q$, are known per se. The value of such inductances generally depends on the value of each direct current $i_d$ and quadrature current $i_d$.

Current control device 22 is configured to calculate a direct voltage setpoint $v_{d,ref}$ and a quadrature voltage setpoint $v_{d,ref}$.

Direct voltage setpoint $v_{d,ref}$ and quadrature voltage setpoint $v_{d,ref}$ are quantities representative of target values for voltages $v_A$, $v_B$, $v_C$ at the terminals of the stator windings for setpoints for voltages $v_A$, $v_B$, $v_C$. Notably, direct voltage setpoint $v_{d,ref}$ and quadrature voltage setpoint $v_{d,ref}$ are only related to the target values of voltages $v_A$, $v_B$, $v_C$.

In particular, current control device 22 is configured to determine direct voltage setpoint $v_{d,ref}$ and quadrature voltage setpoint $v_{q,ref}$ according to direct current setpoint $i_{d,ref}$ and quadrature current setpoint $i_{q,ref}$ calculated by calculation device 20, and from the measured direct current $i_d$ and the measured quadrature current $i_d$ described above.

More precisely, current control device 22 is configured to calculate direct voltage setpoint $v_{d,ref}$ and quadrature voltage setpoint $v_{d,ref}$ according to one or the other from among a first method of calculation and a second method of calculation, according to whether a predetermined condition is fulfilled or not.

If the predetermined condition is fulfilled, current control device 22 is configured to calculate direct voltage setpoint $v_{d,ref}$ and quadrature voltage setpoint $v_{q,ref}$ according to the first method of calculation, using a single proportional-integral controller. In this case, current control device 22 is configured to calculate direct voltage setpoint $v_{d,ref}$ and quadrature voltage setpoint $v_{q,ref}$ by means of relations (3), (4) as follows:

$$v_{q,ref} = K'_{p,q}(i_0 - i_{ref}) + K'_{i,q} \int_{t_0}^{t_f} (i_0 - i_{ref}) dt \qquad (3)$$

$$v_{d,ref} = \sqrt{v_{\lim}^2 - v_{q,ref}^2} \qquad (4)$$

where $K'_{p,q}$ and $K'_{i,q}$ are two predetermined coefficients of the proportional-integral controller associated, in the first method of calculation, with the quadrature voltage setpoint;
$i_0$ is a quantity defined as $i_0 = \sqrt{i_q^2 + i_d^2}$;
$i_{ref}$ is a quantity defined as $i_{ref} = \sqrt{i_{q,ref}^2 + i_{d,ref}^2}$;
$t_0$ is a predetermined initial instant;
$t_f$ is a predetermined final instant later than the predetermined initial instant, a current instant for example;
$v_{lim}$ is a limit voltage defined as $v_{lim} = a v_{DC}$; and
a is the modulation index of inverter 10. The value of modulation index a preferably ranges between $1/\sqrt{3}$ and 1.

Quantity $i_0$ defined above is the norm of a vector (denoted by $i_0$) equal to the vector sum, in the rotating reference frame, of measured direct current $i_d$ and measured quadrature current $i_d$.

Furthermore, quantity $i_{ref}$ defined above, is the norm of a vector (denoted by $i_{ref}$) equal to the vector sum, in the rotating reference frame, of direct current setpoint $i_{d,ref}$ and quadrature current setpoint $i_{q,ref}$.

Advantageously, coefficients $K'_{p,q}$ and $K'_{i,q}$ are selected so that the value of quadrature voltage setpoint $v_{d,ref}$ calculated by relation (3) is bounded, in particular less than or equal to limit voltage $v_{lim}$.

Preferably, the predetermined condition is verified when a first situation occurs where the quantity $(v_{q,ref}^2 + v_{d,ref}^2)$ becomes greater than or equal to a predetermined fraction of the quantity $v_{lim}^2$, advantageously greater than or equal to $0.75 \cdot v_{lim}^2$, for example greater than or equal to $0.9 \cdot v_{lim}^2$, or equal to $v_{lim}^2$.

By way of example, the predetermined condition is thus verified when, while current control device 22 calculates direct voltage setpoint $v_{d,ref}$ and quadrature voltage setpoint $v_{q,ref}$ according to the second method of calculation, the quantity $(v_{q,ref}^2 + v_{d,ref}^2)$ becomes greater than or equal to a predetermined fraction of the quantity $v_{lim}^2$, advantageously greater than or equal to $0.75 \cdot v_{lim}^2$, for example greater than or equal to $0.9 \cdot v_{lim}^2$, or equal to $v_{lim}^2$.

Moreover, if the predetermined condition is not fulfilled, current control device 22 is configured to calculate direct voltage setpoint $v_{d,ref}$ and quadrature voltage setpoint $v_{q,ref}$ according to the second method of calculation, preferably by using two proportional-integral type controllers. In this case, current control device 22 is configured to calculate direct voltage setpoint $v_{d,ref}$ and quadrature voltage setpoint $v_{q,ref}$ by means of relation (5) as follows:

$$\begin{cases} v_{q,ref} = K_{p,q}(i_{q,ref} - i_q) + K_{i,q} \int_{t_0}^{t_f} (i_{q,ref} - i_q) dt \\ v_{d,ref} = K_{p,d}(i_{d,ref} - i_d) + K_{i,d} \int_{t_f}^{t} (i_{d,ref} - i_d) dt \end{cases} \qquad (5)$$

where $K_{p,q}$ and $K_{i,q}$ are two predetermined coefficients of the proportional-integral controller associated, in the second method of calculation, with the quadrature voltage setpoint which are not necessarily equal to coefficients $K'_{p,q}$ and $k'_{i,q}$ mentioned above;
$K_{p,d}$ and $K_{i,d}$ are two predetermined coefficients of the proportional-integral controller associated, in the second method of calculation, with the direct voltage setpoint,
$t_0$ is a predetermined initial instant; and
$t_f$ is a predetermined final instant later than the predetermined initial instant, a current instant for example.

It follows from the above that the first method of calculation corresponds to a situation where defluxing of the machine is required (and performed). Relation (5) ensures that rotary machine 4 operates at maximum power. Moreover, relation (4) leads to the calculation of a voltage setpoint that results in a current injection into the stator windings, causing defluxing of the rotary machine.

Since the quadrature component of the power consumed by rotary machine 4 is predominant over the direct component, it is advantageous that relation (4) is implemented on quadrature voltage $v_{q,ref}$ so that the action of the proportional-integral controller is optimum. Another reason why it is advantageous for relation (4) to be implemented on the quadrature voltage, not on the direct voltage is that the quadrature voltage value is a likely change in sign during the operation of rotary machine 4, so that there is no bijection between the direct voltage and vector $i_0$. Using a single proportional-integral controller provides more robust control of rotary machine 4, which results in a higher stability of the mechanical torque provided by rotary machine 4.

First transformation device 24 is configured to calculate a first, a second and a third phase voltage setpoint, $v_{A,ref}$, $v_{B,ref}$, $v_{C,ref}$ respectively. Each phase voltage setpoint, $v_{A,ref}$, $v_{B,ref}$, $v_{C,ref}$ corresponds to a target voltage for the corresponding phase $v_A$, $v_B$, $v_C$ of the stator of rotary machine 4.

More precisely, first transformation device 24 is configured to calculate phase voltage setpoints $v_{A,ref}$, $v_{B,ref}$, $v_{C,ref}$ from the direct voltage setpoint $v_{d,ref}$ and the quadrature voltage setpoint $v_{d,ref}$ calculated by current control device 22.

Preferably, first transformation device 24 is configured to calculate phase voltage setpoints $v_{A,ref}$, $v_{B,ref}$, $v_{C,ref}$ by applying an inverse Park transformation to direct voltage setpoint $v_{d,ref}$ and quadrature voltage setpoint $v_{q,ref}$. Such a transformation is carried out by applying relation (6) as follows:

$$\begin{pmatrix} V_{A,ref} \\ V_{B,ref} \\ V_{C,ref} \end{pmatrix} = \begin{pmatrix} \cos\theta_e & -\sin\theta_e \\ \cos\left(\theta_e - \frac{2\pi}{3}\right) & -\sin\left(\theta_e - \frac{2\pi}{3}\right) \\ \cos\left(\theta_e + \frac{2\pi}{3}\right) & -\sin\left(\theta_e + \frac{2\pi}{3}\right) \end{pmatrix} \begin{pmatrix} V_{d,ref} \\ V_{q,ref} \end{pmatrix} \quad (6)$$

where, as previously described, $\theta_e$ is the electrical angular position of the rotor with respect to the stator of rotary machine 4.

Pulse width modulation device 28 is configured to generate the switching control signal to be applied to inverter 10. More precisely, pulse width modulation device 28 is configured to determine the switching control signal intended to control inverter 10 so that voltages $v_A$, $v_B$, $v_C$ applied by inverter 10 to the corresponding phases A, B, C of rotary machine 4 are ideally equal to the first, second and third phase voltage setpoint $v_{A,ref}$, $v_{B,ref}$, $v_{C,ref}$ respectively.

Determination of a switching control signal from any phase voltage setpoints is known per se.

The operation of control system 6 is now described.

The control system receives a value of a desired target torque $T_{ref}$ at the outlet of rotary machine 4.

Angular position sensor 12 measures over time the angular position $\theta$ of the rotor of rotary machine 4 with respect to the stator, and it delivers the angular position signal.

Moreover, current sensor 14 measures over time the intensity $i_A$, $i_B$, $i_C$ of the current supplied in each corresponding phase of the stator of rotary machine 4, and it delivers the intensity signal.

Furthermore, voltage sensor 16 measures over time voltage $v_{DC}$ and delivers the voltage signal.

Then, from target torque $T_{ref}$, from the angular speed signal and from the voltage signal, current setpoint calculation device 20 calculates direct current setpoint $i_{d,ref}$ and quadrature current setpoint $i_{q,ref}$.

Moreover, from the intensity signal, second transformation device 26 calculates measured direct current $i_d$ and measured quadrature current $i_q$.

Then, from direct current setpoint $i_{d,ref}$, quadrature current setpoint $i_{q,ref}$, measured direct current $i_d$ and measured quadrature current $i_q$, current control device 22 calculates direct voltage setpoint $v_{d,ref}$ and quadrature voltage setpoint $v_{q,ref}$.

More precisely, if the predetermined condition is fulfilled, current control device 22 calculates direct voltage setpoint $v_{d,ref}$ and quadrature voltage setpoint $v_{q,ref}$ according to the first method of calculation, which uses a single proportional-integral controller.

If the predetermined condition is not fulfilled, current control device 22 calculates direct voltage setpoint $v_{d,ref}$ and quadrature voltage setpoint $v_{q,ref}$ according to the second method of calculation, which uses for example two proportional-integral type controllers.

First transformation device 24 then calculates the first, second and third phase voltage setpoint $v_{A,ref}$, $v_{B,ref}$, $v_{C,ref}$.

Pulse width modulation device 28 then generates the switching control signal in order to control inverter 10 so that voltages $v_A$, $v_B$, $v_C$ applied by inverter 10 to the corresponding phases A, B, C of rotary machine 4 are equal to the first, second and third phase voltage setpoint $v_{A,ref}$, $v_{B,ref}$, $v_{C,ref}$ respectively.

According to a variant of the invention, second transformation device 26 is configured to apply first a Clarke transformation to intensities $i_A$, $i_B$, $i_C$, then a Park transformation to the result obtained, for obtaining measured direct current $i_d$ and measured quadrature current $i_q$. The Clarke transformation is known per se.

According to another variant, limit voltage $v_{lim}$ represents only a fraction of quantity $a \cdot v_{DC}$, advantageously at least $0.5 \cdot a \cdot v_{DC}$, and preferably at least $0.75 \cdot a \cdot v_{DC}$, for example at least $0.9 \cdot a \cdot v_{DC}$.

According to another variant, the predetermined condition is verified when a second situation occurs where an angular speed co of the rotor, equal to the time derivative of angular position $\theta$ of the rotor, is greater than or equal to a predetermined base speed $\omega_b$.

According to another variant, the predetermined condition is verified when one or the other of the previously described first situation or second situation occurs.

According to another variant, current control device 22 is configured to calculate direct voltage setpoint $v_{d,ref}$ and quadrature voltage setpoint $v_{q,ref}$ according to the first method of calculation only, at all times and without verification of the fulfilment of any condition.

According to another variant, calculator 18 is configured to control the operation of inverter 10 based not on target torque $T_{ref}$, but on a target rotational speed corer of the rotor of rotary machine 4. In this case, calculator 18 further comprises a conversion device (not shown) configured to convert target rotational speed corer to the target torque $T_{ref}$ to be provided to target current calculation device 20. In particular, the conversion device is configured to convert target rotational speed $\omega_{ref}$ to target torque $T_{ref}$ from the angular speed signal provided by angular speed sensor 12, by use of relation (7) as follows:

$$T_{ref} = G_p(\omega_{ref} - \omega) + G_i \int_{t_0}^{t_f} (\omega_{ref} - \omega) dt \quad (7)$$

where $G_p$ and $G_i$ are two predetermined coefficients;
$t_0$ is a predetermined initial instant; and
$t_f$ is a predetermined final instant later than the predetermined initial instant, a current instant for example.

The method and the system according to the invention are particularly advantageous. Indeed, by using a single proportional-integral controller, the method according to the invention reduces the coupling between the direct and quadrature quantities, which results in less non-linearities in the control, and therefore enables control of the rotary machine wherein the maximum available voltage is applied to the terminals of the rotary machine, without any instability problems. Such a method is therefore capable of increasing the efficiency of the rotary machine during defluxing.

Moreover, the method and the system according to the invention use linear relations for implementing control by the control accounting for a difference between the current $i_0$ consumed by rotary machine 4 and current setpoint ref for determining quadrature voltage setpoint $v_{q,ref}$ according to a linear relation (without prior constraint on the value of quadrature voltage setpoint $v_{q,ref}$). This results in increased stability in relation to some conventional control methods where, for example, the controlled quantity is an angle, in the rotating reference frame, of the terminal voltage of rotary machine 4. Because the relation between such an angle and the current consumed by rotary machine 4 is not linear, such a conventional method provides less satisfactory performances than the method according to the invention, notably in terms of stability.

The method and the system according to the invention also enable monitoring of the angle formed between the respective directions of the magnetic fluxes of the magnets of the rotor and the currents, in the rotating reference frame attached to the rotor. It is thus possible to control the inverter to maintain the value of the angle below a predetermined angle, in order for example to prevent the machine from switching from motor mode operation, where the rotary machine absorbs energy and delivers a mechanical torque, to generator mode operation, where the rotary machine converts mechanical energy at the rotor to electrical energy.

The invention claimed is:

1. A method of controlling a permanent-magnet synchronous or a synchro-reluctant three-phase rotary machine, comprising:
   measuring a current flowing through each phase of a stator of the rotary machine;
   first calculating with a single proportional-integral controller a switching control signal for controlling an inverter, according to each measured current, and a target value of a mechanical torque provided by the rotary machine or a target value of an angular speed of a rotor of the rotary machine in relation to a stator of the rotary machine with the inverter being configured to convey electrical energy between a continuous electrical energy source and each phase of the stator of rotary machine, and wherein
   the first calculation comprises determining a quadrature voltage setpoint ($v_{q,ref}$) according to:

$$v_{q,ref}=K'_{p,q}(i_0-i_{ref})+K'_{i,q}\int_{t_0}^{t_f}(i_0-i_{ref})dt$$

where $v_{q,ref}$ is the quadrature voltage setpoint,
$K'_{p,q}$ and $K'_{i,q}$ are predetermined coefficients of the single proportional-integral controller;
$i_0$ is a quantity defined as $i_0=\sqrt{i_q^2+i_d^2}$,
$i_{ref}$ is a quantity defined as $i_{ref}=\sqrt{i_{q,ref}^2+i_{d,ref}^2}$,
$t_0$ is a predetermined initial instant,
$t_f$ is a predetermined final instant later than the predetermined initial instant,
$i_d$ and $i_q$ are respectively a measured direct current and a measured quadrature current dependent on each measured current,
$i_{d,ref}$ and $i_{q,ref}$ are respectively a direct current setpoint and a quadrature current setpoint which each are representative of target value of the mechanical torque provided by the rotary machine or of the target value of the angular speed of the rotor of rotary machine in relation to the stator,
the switching control signal is dependent on a quadrature voltage setpoint and the first calculation further comprises determining a direct voltage setpoint according to:

$$v_{d,ref}=\sqrt{v_{lim}^2-v_{q,ref}^2}$$

where $v_{d,ref}$ is the direct voltage setpoint, $v_{lim}$ is a limit voltage defined as $v_{lim}=\alpha v_{DC}$, $\alpha$ is a predetermined modulation index of inverter, and the switching control signal further depends on the direct voltage setpoint direct voltage setpoint ($v_{d,ref}$); and
   the inverter is controlled by use of the calculated switching control signal.

2. The control method as claimed in claim 1, wherein the value of the modulation index ranges between $1/\sqrt{3}$ and 1.

3. The control method as claimed in claim 1, wherein predetermined coefficients of the single proportional-integral controller are selected so that a value of quadrature voltage setpoint is less than or equal to a limit voltage defined as $v_{lim}=\alpha v_{DC}$
where $v_{lim}$ is the limit voltage,
$\alpha$ is a predetermined modulation index of inverter, and
$v_{DC}$ is a voltage between source and a potential reference.

4. The control method as claimed in claim 1, wherein predetermined coefficients of the single proportional-integral controller are selected so that a value of the quadrature voltage setpoint is less than or equal to a limit voltage defined as $v_{lim}=\alpha v_{DC}$
where $v_{lim}$ is the limit voltage,
$\alpha$ is a predetermined modulation index of inverter, and
$v_{DC}$ is a voltage between source and a potential reference.

5. The control method as claimed in claim 1, wherein the first calculation is implemented based on a predetermined condition being verified.

6. The control method as claimed in claim 2, wherein the first calculation is implemented based on a predetermined condition being verified.

7. The control method as claimed in claim 3, wherein the first calculation is implemented based on a predetermined condition being verified.

8. The control method as claimed in claim 5, comprising:
   determining a direct voltage setpoint and a quadrature voltage setpoint depending on each measured current, the predetermined condition is verified with a sum of the squares of direct voltage setpoint and the quadrature voltage setpoint is greater than or equal to a predetermined fraction of a square of a predetermined limit voltage.

9. The control method as claimed in claim 8, wherein the direct voltage setpoint and the quadrature voltage setpoint are determined during a second calculation of the switching control signal, distinct from the first calculation, the predetermined condition being verified that while carrying out the second calculation, a sum of squares of the direct voltage setpoint and of the quadrature voltage setpoint becomes greater than or equal to the predetermined fraction of a square of a predetermined limit voltage, or equal to a square of the predetermined limit voltage.

10. The control method as claimed in claim 5, wherein the predetermined condition is verified if the angular speed of the rotor of rotary machine in relation to the stator is greater than or equal to a predetermined base speed.

11. A system for controlling a permanent-magnet synchronous or synchro-reluctant three-phase rotary machine, comprising:
   a current sensor configured to measure a current flowing through each phase of a stator of rotary machine;
   an inverter configured to convey electrical energy between a continuous electrical energy source and each phase of the stator of rotary machine;
   a calculator configured to carry out, using a single proportional-integral controller, a first calculation of a switching control signal for control of an inverter, according to each current measured by the current sensor, and of a quantity representative of a target value of a mechanical torque provided by the rotary machine or a target value of an angular speed of a rotor of the rotary machine in relation to a stator of the rotary machine; and the calculator being further configured to apply to the inverter the first calculated switching control signal to control inverter; and
   wherein the calculator implements a control method of:
   first calculating with the single proportional-integral controller a switching control signal for controlling the inverter, according to each measured current, and of a target value of mechanical torque provided by the rotary machine or a target value of an angular speed of the rotor of rotary machine in relation to the stator with the inverter being configured to convey electrical energy between a continuous electrical energy source and each phase of the stator of the rotary machine; and
the inverter is controlled by use of the first calculated switching control signal;
the first calculation determines a quadrature voltage setpoint ($v_{q,ref}$) according to:

$$v_{q,ref} = K'_{p,q}(i_0 - i_{ref}) + K'_{i,q} \int_{t_0}^{t_f} (i_0 - i_{ref}) dt$$

where $v_{q,ref}$ is the quadrature voltage setpoint,
$K'_{p,q}$ and $K'_{i,q}$ are predetermined coefficients of the single proportional-integral controller,
$i_0$ is a quantity defined as $i_0 = \sqrt{i_q^2 + i_d^2}$,
$i_{ref}$ is a quantity defined as $i_{ref} = \sqrt{i_{q,ref}^2 + i_{d,ref}^2}$,
$t_0$ is a predetermined initial instant,
$t_f$ is a predetermined final instant later than the predetermined initial instant,
$i_d$ and $i_q$ are respectively a measured direct current and a measured quadrature current dependent on each measured current,
$i_{d,ref}$ and $i_{q,ref}$ are respectively a direct current setpoint and a quadrature current setpoint which each are representative of target value of the mechanical torque provided by the rotary machine or the target value of the angular speed of the rotor of rotary machine in relation to the stator, and
the switching control signal is dependent on a quadrature voltage setpoint; and wherein the first calculation determine the direct voltage setpoint according to:

$$v_{d,ref} = \sqrt{v_{lim}^2 - v_{q,ref}^2}$$

where $v_{d,ref}$ is the direct voltage setpoint,
$v_{lim}$ is a limit voltage defined as $v_{lim} = \alpha v_{DC}$,
$\alpha$ is a predetermined modulation index of inverter, and
the switching control signal further depends on the direct voltage setpoint ($v_{d,ref}$).

12. The control system as claimed in claim 11, wherein the modulation index ranges between $1/\sqrt{3}$ and 1.

* * * * *